United States Patent
Kobayashi

(10) Patent No.: US 8,055,923 B2
(45) Date of Patent: Nov. 8, 2011

(54) ELECTRONIC CONTROL UNIT AND SIGNAL MONITORING CIRCUIT

(75) Inventor: Miyuki Kobayashi, Kariya (JP)

(73) Assignee: Denso Corporation, Kariya (JP)

( * ) Notice: Subject to any disclaimer, the term of this patent is extended or adjusted under 35 U.S.C. 154(b) by 678 days.

(21) Appl. No.: 12/207,523

(22) Filed: Sep. 10, 2008

(65) Prior Publication Data

US 2009/0070608 A1    Mar. 12, 2009

(30) Foreign Application Priority Data

Sep. 12, 2007    (JP) ................................ 2007-237134

(51) Int. Cl.
*G06F 1/00* (2006.01)
*G06F 1/26* (2006.01)
*G06F 1/32* (2006.01)

(52) U.S. Cl. ........................ 713/320; 713/300

(58) Field of Classification Search .................. 713/300, 713/320
See application file for complete search history.

(56) References Cited

U.S. PATENT DOCUMENTS 7,132,944 B1 *    11/2006    Kron et al. ................. 340/572.1
2004/0215990 A1 *    10/2004    Allen et al. ................... 713/320

FOREIGN PATENT DOCUMENTS

JP    8-320741    12/1996
JP    2004-234463    8/2004

* cited by examiner

*Primary Examiner* — Mark Connolly
(74) *Attorney, Agent, or Firm* — Nixon & Vanderhye PC

(57) ABSTRACT

An electronic control unit has a microcomputer and a signal monitoring circuit. When a brake pedal is pressed down and an analog signal from a brake pedal sensor is changed in a low power consumption operation mode of the microcomputer, the signal monitoring circuit operates cyclically. When the signal monitoring circuit starts the operation, a capacitor is charged with a constant current for only a charging time stored in a memory. When a comparator detects that the analog signal is lower than the charge voltage of the capacitor, a wakeup signal is output from the comparator to the microcomputer to cause the microcomputer to operate in the normal operation mode. The charging time is pre-stored in a memory of the microcomputer.

9 Claims, 5 Drawing Sheets

US 8,055,923 B2

ELECTRONIC CONTROL UNIT AND SIGNAL MONITORING CIRCUIT

CROSS REFERENCE TO RELATED APPLICATION

This application is based on and incorporates herein by reference Japanese Patent Application No. 2007-237134 filed on Sep. 12, 2007.

FIELD OF THE INVENTION

The present invention relates to a technique which wakes up a microcomputer to shift it from a low power consumption operation mode to a normal operation mode.

BACKGROUND OF THE INVENTION

In an in-vehicle electronic control unit, a microcomputer disposed therein operates with an in-vehicle battery as a power supply.

In the in-vehicle electronic control unit that is required to operate even when an ignition switch is off, that is, in the off-state during which the in-vehicle battery is not changed, particularly when the ignition switch is off, power consumption is required to be reduced as much as possible. For this reason, when given conditions including a condition where the ignition switch is off are satisfied, the operation mode is shifted to a low power consumption operation mode (standby mode or sleep mode) which is smaller in the power consumption than the normal operation mode.

Also, in the in-vehicle electronic control unit, there is required a function of shifting (waking up) the microcomputer to the normal operation mode when some signals are monitored, and the occurrence of a predetermined change in the signals is detected even when the microcomputer is in the low power consumption operation mode.

For example, it is assumed that an analog signal having a voltage value changed according to the amount of operating an operation section such as a brake by a vehicle driver is to be monitored. Then, there is provided a wakeup function of waking up the microcomputer when it is determined that the operation section has been operated upon detecting that a magnitude relation of the analog signal and a reference voltage reaches a predetermined relation (analog signal<reference voltage, or analog signal>reference voltage).

Further, because it is considered that an optimum value of the reference voltage is different in each of the vehicle lines, it is required that a value of the reference voltage used for the wakeup function can be arbitrarily changed.

Under the circumstances, as a technique of realizing the wakeup function, it is proposed that, even when the microcomputer becomes the low power consumption operation mode, the microcomputer is returned to the normal operation mode at regular time intervals, and the analog signal to be monitored is subjected to A/D conversion by means of a built-in A/D converter. The A/D conversion value is compared with a reference voltage corresponding value within a memory. When both of those values satisfy a predetermined relationship, the microcomputer remains in the normal operation mode without returning to the low power consumption operation mode again.

However, in this method, because the microcomputer must be intermittently returned to the normal operation mode even temporarily, the power consumption cannot be sufficiently reduced.

JP 2004-234463A proposes a circuit that cyclically subjects an analog signal to A/D conversion, and compares the A/D conversion value with a value within an expected value register to output a wakeup signal to the CPU when the compared values satisfy a given relationship, in addition to the CPU.

However, in JP 2004-234463A, because the circuit including the A/D converter must be provided in addition to the microcomputer, the circuit scale and the costs increase.

SUMMARY OF THE INVENTION

It is therefore an object of the present invention to realize a wakeup function that monitors an analog signal and shifts a microcomputer from a low power consumption operation mode to a normal operation mode without necessitating a large-scaled circuit.

According to one aspect of the present invention, an electronic control unit is configured with a microcomputer and a signal monitoring circuit. The microcomputer operatively switches to any one of a normal operation mode and a low power consumption operation mode. The signal monitoring circuit cyclically operates at least when the microcomputer is in the low power consumption operation mode, and outputs a wakeup signal that instructs the microcomputer to shift from the low power consumption operation mode to the normal operation mode upon detecting that a relationship between an analog signal received from an external side a reference voltage satisfies a predetermined relationship.

The signal monitoring circuit includes a capacitor, a constant current circuit for charging the capacitor with a constant current, a memory that stores a charging time during which the constant current circuit charges the capacitor, a timer circuit that allows the constant current circuit to charge the capacitor for only the charging time that is stored in the memory during an operation of the signal monitoring circuit, a discharging circuit for discharging the capacitor while stopping the operation of the signal monitoring circuit, and a comparator that compares the analog signal with a charge voltage of the capacitor. The charging time for allowing the charge voltage at charging completion of the capacitor to be used as the reference voltage is stored in the memory The wakeup signal is output to the microcomputer based on comparison results of the comparator.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
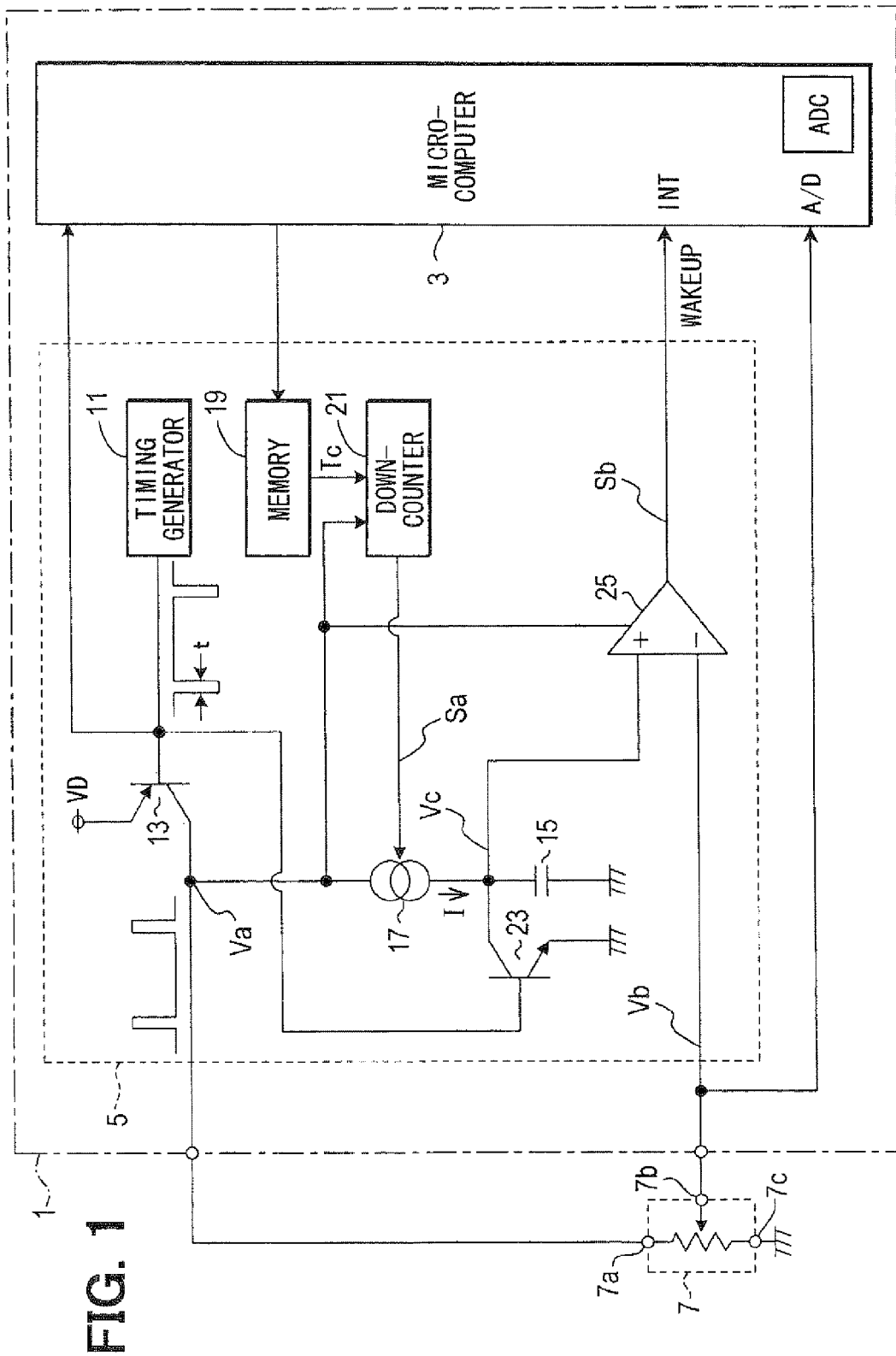
FIG. 1 is a circuit diagram showing an electronic control unit according to a first embodiment of the present invention.

Referring first to FIG. 1, an electronic control unit (ECU) 1 is an in-vehicle ECU that operates with an in-vehicle battery as a power supply. The ECU 1 operates even when an ignition switch is off (in the off-state) during which the in-vehicle battery is not charged, and controls body system electric loads such as a door lock or a power window. This ECU 1 includes a microcomputer 3 that conducts various processing for controlling an object to be controlled, and a signal monitoring circuit 5. An A/D conversion input terminal A/D of the microcomputer 3 receives an analog signal Vb from a potentiometer 7 that functions as a brake pedal sensor which is disposed outside the ECU 1.

In the potentiometer 7, when it is assumed that a resistance between a signal output terminal 7b that outputs an analog signal Vb and a negative terminal 7c that is connected to a ground is R1, and a resistance between the signal output terminal 7b and a positive terminal 7a to which a supply voltage is applied is R2, a ratio of R1 and R2 changes according to the press-down amount of a brake pedal for the vehicle. When the brake pedal is not pressed down, R1/(R1+R2) that is a voltage dividing ratio of the supply voltage becomes maximum, and the voltage dividing ratio becomes smaller as the press-down amount of the brake pedal is larger. Accordingly, when the supply voltage is applied to the positive terminal 7a of the potentiometer 7, the analog signal Vb that is an output voltage of the potentiometer 7 becomes maximum when the brake pedal is not pressed down, and becomes lower than the maximum value as the brake pedal is pressed down.

The microcomputer 3 determines that the analog signal Vb from the potentiometer 7 is higher than a reference voltage Vth for determining whether the brake pedal is pressed down, and that standby conditions including a condition in which the ignition switch is off are satisfied. In this situation, the microcomputer 3 shifts from a normal operation mode to a standby mode that is a low power consumption operation mode, which is smaller in the power consumption than the normal operation mode.

Although being not shown, the microcomputer 3 receives an ignition switch signal indicative of an on/off state of the ignition switch, and the microcomputer 3 determines the on/off state of the ignition switch on the basis of the ignition switch signal. Also, the microcomputer 3 determines the voltage value of the analog signal Vb by means of a built-in A/D converter (ADC) in the case of the normal operation mode. When the normal operation mode is shifted to the standby mode, the microcomputer 3 stops internal operation clocks, or reduces the frequency of the operation clocks. Then, the microcomputer 3 stops functions other than a function of receiving a signal for shifting (waking up) the microcomputer 3 from the standby mode to the normal operation mode, such as a wakeup signal or an ignition switch signal which will be described later. The microcomputer 3 thus reduces the power consumption.

On the other hand, the signal monitoring circuit 5 is a circuit that cyclically operates at a predetermined interval, and outputs a wakeup signal Sb to the microcomputer 3 upon detecting that the analog signal Vb of the object to be monitored is lower than the reference voltage Vth (that is, the brake pedal is pressed down), to thereby wake up the microcomputer 3. The signal monitoring circuit 5 is formed within another IC that is different from the microcomputer 3.

The signal monitoring circuit 5 includes an operation timing generator circuit 11 that determines the operation timing of the signal monitoring circuit 5, a power supply transistor 13, a capacitor 15, and a constant current circuit 17 for charging the capacitor 15 with a constant current I, a memory 19 that stores the charging time (in more detail, digital data indicative of the charging time) Tc of the capacitor 15 therein.

The signal monitoring circuit 5 also includes a down-counter 21 for allowing the constant current circuit 17 to charge the capacitor 15 for only the charging time stored within the memory 19 from the operation start time of the signal monitoring circuit 5, a discharge transistor 23 for discharging the capacitor 15, and a comparator 25 that compares the analog signal Vb with the charge voltage Vc (capacitor voltage) of the capacitor 15.

The operation timing generator circuit 11 outputs clock signals that become low for a given time t at regular time intervals as the timing signals for cyclically operating the signal monitoring circuit 5.

The power supply transistor 13 is a PNP transistor, and a constant supply voltage VD is applied to the emitter of the power supply transistor 13. The supply voltage VD is generated from a voltage of the in-vehicle battery by means of a power supply circuit (not shown) which is disposed within the ECU 1.

The collector of the power supply transistor 13 is connected to the power supply terminals of the constant current circuit 17 and the comparator 25. The collector of the power supply transistor 13 is also connected to the positive terminal 7a of the potentiometer 7. The power supply transistor 13 turns on only while the clock signal from the operation timing generator circuit 11 is at low level, and applies the supply voltage VD to the potentiometer 7, the constant current circuit 17, and the comparator 25. In this embodiment, a period during which the clock signal is low is the operation period of the signal monitoring circuit 5.

The capacitor 15 is connected between the constant current circuit 17 and the ground.

Figure 2:
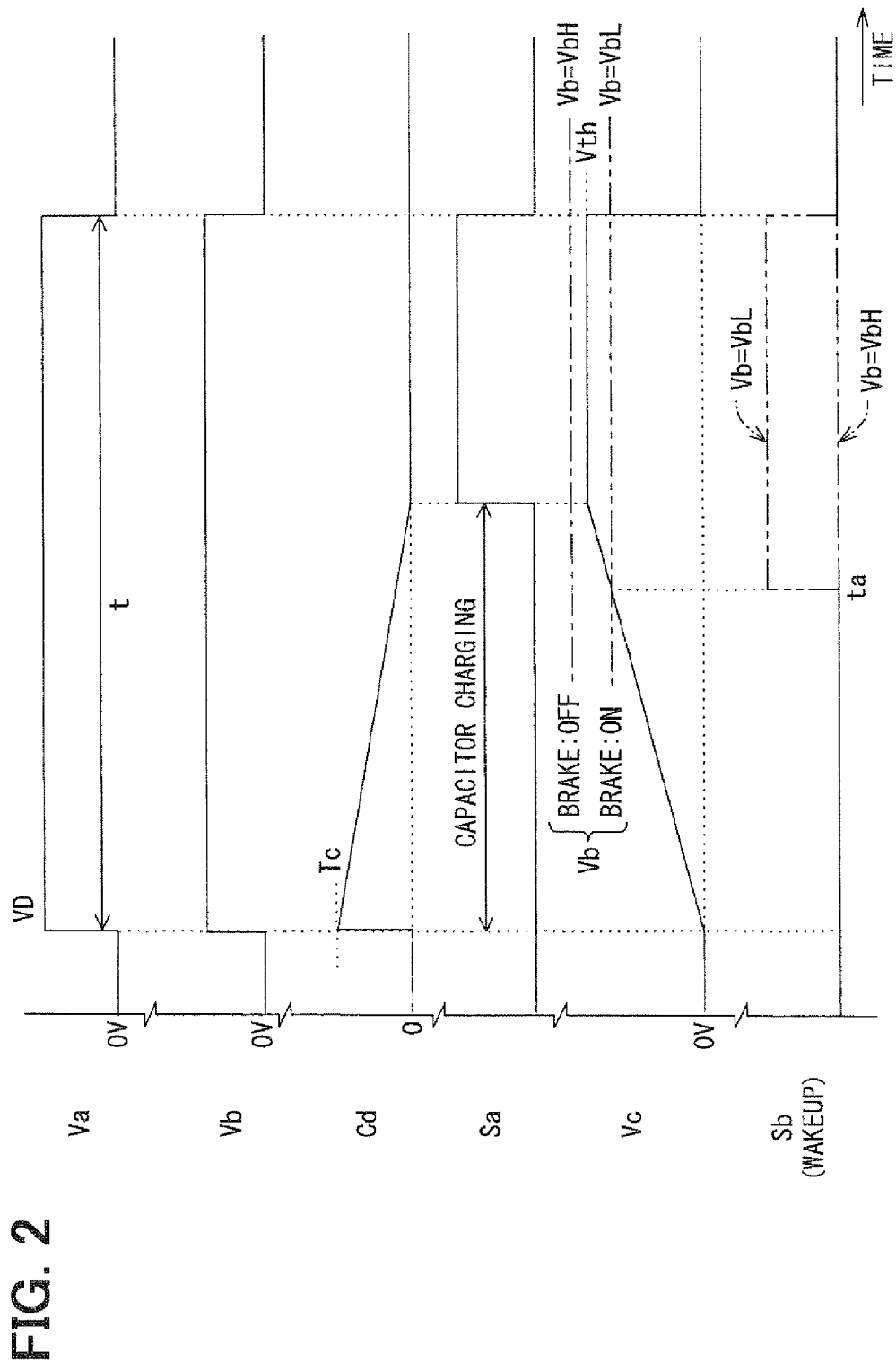
FIG. 2 is a timing chart showing the operation of a signal monitoring circuit in the first embodiment.

As shown in FIG. 2, when the power supply transistor 13 turns on, and the collector voltage Va of the power supply transistor 13 becomes a high level corresponding to the supply voltage VD, the down-counter 21 presets the charging time (memory value) Tc which has been stored in the memory 19, and starts down-count. When the preset charging time Tc elapses, and the count value Cd becomes 0 (underflow is conducted), the down-counter 21 outputs an underflow signal Sa of the high level until the collector voltage Va of the power supply transistor 13 returns to the low level (=0 V) since that time point.

As shown in FIG. 2, when the power supply transistor 13 turns on so that the supply voltage VD is applied to the constant current circuit 17, the constant current circuit 17 operates until the constant current circuit 17 receives the underflow signal Sa from the down-counter 21 since that time point, and charges the capacitor 15 with a constant current. With this operation, the capacitor 15 is charged with the constant current from the constant current circuit 17 for only the charging time Tc stored in the memory 19 since the operation start time of the signal monitoring circuit 5 at which the power supply transistor 13 turns on.

Then, the charging time for allowing the charge voltage Vc at the charging completion time of the capacitor 15 due to the operation of the down-counter 21 to reach the reference voltage Vth is stored in the memory 19 by means of the microcomputer 3. The charging time Tc is shorter than the time t during which the clock signal from the operation timing generator circuit 11 is low.

The discharging transistor 23 is an NPN transistor, and has the collector and the emitter connected to both ends of the capacitor 15. The discharging transistor 23 turns on when the clock signal from the operation timing generator circuit 11 is high, to thereby discharge the capacitor 15. For this reason, the capacitor 15 is discharged during the operation stop of the signal monitoring circuit 5, and is then reset.

When the supply voltage VD is applied to the comparator 25 from the collector of the power supply transistor 13, the comparator 25 operates. The comparator 25 compares the analog signal Vb with the capacitor voltage Vc. Then, when the comparator 25 detects that the analog signal Vb is lower than the capacitor voltage Vc, the capacitor 25 outputs the wakeup signal Sb of high level to the microcomputer 3.

In the ECU 1 configured as described above, when the signal monitoring circuit 5 starts to operate, the capacitor 15 is charged with the constant current I from the constant current circuit 17 for only the charging time Tc that is stored in the memory 19 in the signal monitoring circuit 5. When the signal monitoring circuit 5 stops to operate, the capacitor 15 is discharged by the discharging transistor 23. For this reason, the capacitor voltage Vc becomes finally the voltage that is proportional to T×I every time the signal monitoring circuit 5 operates. The voltage becomes the reference voltage Vth (FIG. 2).

When the microcomputer 3 is in the standby mode, the signal monitoring circuit 5 operates, and the capacitor voltage Vc is compared with the analog signal Vb by means of the comparator 25. Only when the analog signal Vb of the potentiometer 7 is lower than the reference voltage Vth, the wakeup signal Sb is output to the microcomputer 3 from the signal monitoring circuit 5.

It is assumed that the brake pedal is not pressed down when the monitoring circuit 5 operates. In this case, as indicated by a one-dot chain line in FIG. 2, the analog signal Vb is VbH which is higher than the reference voltage Vth. Even when the capacitor 15 is charged for the charging time Tc stored in the memory 19, the analog signal Vb becomes still equal to or higher than the capacitor voltage Vc, and the wakeup signal is not output from the comparator 25.

On the contrary, if the brake pedal is pressed down when the signal monitoring circuit 5 operates, as indicated by a two-dot chain line in FIG. 2, the analog signal Vb is VbL which is lower than the reference voltage Vth. In this case, the capacitor voltage Vc exceeds the analog signal Vb, and a relationship of Vb<Vc is satisfied by the time the charging time Tc elapses after the capacitor 15 starts to be charged. As a result, the wakeup signal Sb (high level signal) is output to the microcomputer 3 from the comparator 25 at that time point (time ta in FIG. 2).

The microcomputer 3 thus returns to the normal operation mode from the standby mode. The wakeup signal Sb from the signal monitoring circuit 5 is input to an interrupt input terminal INT of the microcomputer 3. An external interrupt request occurs in the microcomputer 3 in response to the wakeup signal Sb, and the microcomputer 3 returns to the normal operation mode from the standby mode.

As described above, in the signal monitoring circuit 5, the capacitor 15 is charged with the constant current I for only the charging time Tc that is stored in the memory 19 with the result that the time is converted into the voltage. With the above configuration, a desired reference voltage Vth is produced corresponding to the charging time that is stored in the memory 19.

Figure 3:
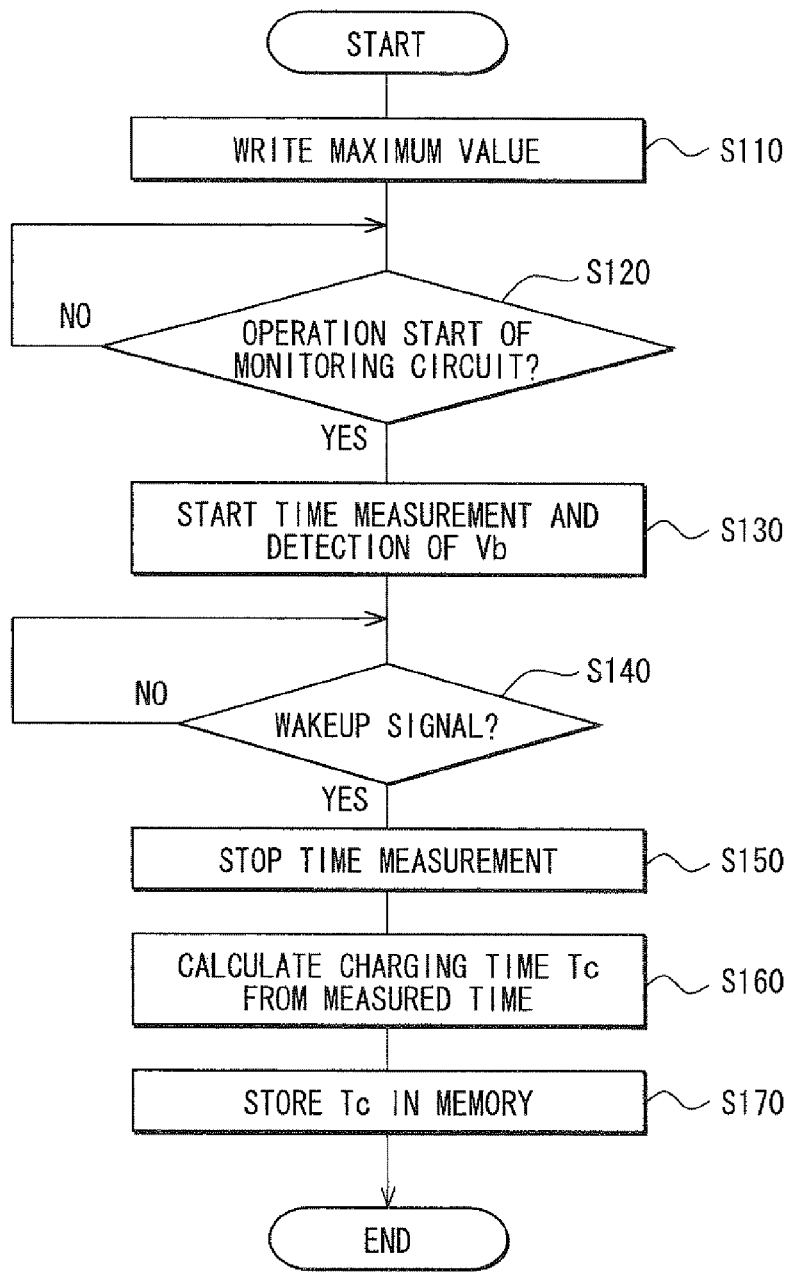
FIG. 3 is a flowchart showing a charging time setting process executed in the first embodiment.

The charging time setting process is executed as shown in FIG. 3 to write the charging time Tc in the memory 19 by the microcomputer 3. This charging time setting process is executed during the period after the microcomputer 3 determines that the standby conditions are satisfied and before the microcomputer 3 is shifted to the standby mode (that is, immediately before the microcomputer 3 is shifted to the standby mode).

As shown in FIG. 3, when the microcomputer 3 starts the execution of the charging time setting process, the microcomputer 3 first writes the maximum value in the memory 19 of the signal monitoring circuit 5 in S110. In this example, the written maximum value is a maximum value that can be written in the memory 19, which is a value corresponding to a time longer than one operating time t of the signal monitoring circuit 5. Also, the reason that the maximum value is written in the memory 19 is because the limit of the charging time Tc due to the down-counter 21 is cancelled, and because the constant current circuit 17 continuously charges the capacitor 15 until the capacitor voltage Vc reaches the analog signal Vb when the signal monitoring circuit 5 operates. Instead of the maximum value being written in the memory 19, for example, the underflow signal Sa can be prevented from being output from the down-counter 21, or the underflow signal Sa can be prevented from being transmitted to the constant current circuit 17 from the down-counter 21.

Then, in a subsequent S120, the microcomputer 3 waits for the signal monitoring circuit 5 to start the operation, and for the analog signal Vb to be input to the A/D conversion input terminal.

In this example, as shown in FIG. 1, the microcomputer 3 inputs the clock signal that is output from the operation timing generator circuit 11 of the signal monitoring circuit 5. Then, in S120, the microcomputer 3 monitors the clock signal, and determines that the signal monitoring circuit 5 starts the operation when the clock signal changes from high to low, and proceeds to S130. Then, in S130, the microcomputer 3 starts the time measurement, and detects the voltage value of the analog signal Vb which is input to the A/D conversion input terminal by the built-in A/D converter.

In S120, the microcomputer 3 continues to detect the voltage value of the analog signal Vb which is input to the A/D conversion input terminal by the built-in A/D converter, and determine that the signal monitoring circuit 5 starts the operation when the detected value exceeds the determination value which can be regarded as 0 V. This is because, when the signal monitoring circuit 5 starts the operation, the supply voltage VD is applied to the potentiometer 7, and the analog signal Vb is out of 0V.

Then, in S140, the microcomputer 3 waits for the wakeup signal Sb from the signal monitoring circuit 5 (that is, an output of the comparator 25) to change from low to high. When the wakeup signal Sb changes to high, the microcomputer 3 stops or terminates the time measurement, and stores the measured value as the measurement time in a subsequent S150.

That is, the analog signal Vb when the charging time setting process is executed is a voltage (VbH indicated by the one-dot chain line of FIG. 2 in this embodiment) when the brake pedal is not pressed down. In the processing of S110 to S150, the microcomputer 3 allows the constant current circuit 17 to continuously charge the capacitor 15 until the capacitor voltage Vc reaches the analog signal Vb, and operates the signal monitoring circuit 5 in that state The microcomputer 3 measures a period of time required until the comparator 25 detects that the capacitor voltage Vc has reached the analog signal Vb (=VbH) after the charging of the capacitor 15 starts. Then, the period of time that is measured in the processing of S110 to S150 is a period of time required to charge the capacitor 15 until the capacitor voltage Vc becomes equal to the analog signal Vb (=VbH) by the constant current I from the constant current circuit 17. The period of time reflects the actual constant current and the actual capacitance of the capacitor 15.

Then, in S160, the microcomputer 3 determines the charging time T to be written in the memory 19 on the basis of the measurement time that has been stored in the above S150.

More specifically, it is assumed that the measurement time is T1, the voltage value of the analog signal Vb which is detected in S130 (that is, the actual measurement value of VbH) is V1, and the target reference voltage is Vth. Then, the charging time Tc to be written in the memory 19 is determined according to the following Expression 1. The value (fixed value) of VbH which has been known in design can be used as V1 that is applied to Expression 1.

$$Tc = T1 \times Vth/V1 \qquad \text{Ex. 1}$$

Also, for example, when the reference voltage Vth is set to a voltage that is lower than V1 by a given voltage V2, Vth in Expression 1 can be substituted with "V1−V2" to determine the charging time Tc. When the reference voltage Vth is set to a voltage that is higher than the voltage V1 by the given voltage V2, the reference voltage Vth can be substituted with "V1+V2" to determine the charging time Tc.

Subsequently, the microcomputer 3 updates and writes the charging time Tc that has been determined in the above S160. Thereafter, the microcomputer 3 completes the charging time setting process, and shifts to the standby mode.

According to the above charging time setting process, the microcomputer 3 determines the charging time Tc required to charge the capacitor 15 up to the reference voltage Vth since the time that reflects the actual constant current and the real capacitance of the capacitor, which is the period of time required to charge the capacitor 15 with the constant current I of the constant current circuit 17 until Vc=VbH is satisfied. For this reason, the microcomputer 3 is capable of storing the charging time T for obtaining the target reference voltage Vth in the memory 19 without being affected by the variation of the constant current of the constant current circuit 17 and the capacitance of the capacitor.

According to the signal monitoring circuit 5 disposed in the ECU 1, the wakeup function that monitors the analog signal Vb and shifts the microcomputer 3 of the standby mode to the normal operation mode can be realized by a small-scaled circuit without using an A/D converter or a D/A converter. In particular, in the ECU having an IC which is capable of integrating the signal monitoring circuit 5 outside of the microcomputer 3, the signal monitoring circuit 5 can be inexpensively realized.

Also, when the microcomputer 3 is in the standby mode, because the signal monitoring circuit 5 does not continuously operate but only cyclically operates, the power consumption other than the microcomputer 3 can be suppressed. Further, because the supply voltage VD is supplied to the potentiometer 7 only when the signal monitoring circuit 5 operates, the power consumption can be further suppressed.

Furthermore, the microcomputer 3 executes the charging time setting process shown in FIG. 3 every time immediately before the microcomputer 3 shifts to the standby mode to write the charging time T in the memory 19. As a result, the charging time T that allows the reference voltage Vth to be precisely obtained can be stored in the memory 19 even when the constant current of the constant current circuit 17 and the capacitor capacitance are varied due to a change in the ambient temperature or a secular change.

In this embodiment, the down-counter 21 corresponds to a timer circuit, and the discharging transistor 23 corresponds to a discharging circuit. Also, in the processing of FIG. 3, S110 to S150 correspond to a time measuring process, and S160 and S170 correspond to a charging time updating process.

Second Embodiment

In the first embodiment, the potentiometer 7 is configured to decrease the voltage of the analog signal Vb by pressing down the brake pedal. On the other hand, in a second embodiment shown in FIG. 3, the potentiometer 7 is configured to increase the voltage of the analog signal Vb by pressing down the brake pedal.

That is, in the second embodiment, when the supply voltage VD is applied to the positive terminal 7a of the potentiometer 7, the analog signal Vb from the potentiometer 7 becomes a minimum value which is larger than 0V when the brake pedal is not pressed down, and becomes a voltage which is larger than the minimum value when the brake pedal is pressed down.

For this reason, an ECU 31 of the second embodiment is different from the ECU 1 of the first embodiment as follows.

First, the microcomputer 3 detects that the analog signal Vb from the potentiometer 7 when the supply voltage VD is applied to the microcomputer 3 is lower than the reference voltage Vth, thereby confirming a fact that the brake pedal is not pressed down. Then, the microcomputer 3 shifts to the standby mode with the fact as one of the standby conditions.

Also, the signal monitoring circuit 5 is replaced with a signal monitoring circuit 33. The signal monitoring circuit 33 is different from the signal monitoring circuit 5 of the first embodiment in the following points (1) and (2).

(1) The input signals to the respective input terminals of the comparator 25 are opposite to those in the first embodiment. That is, the analog signal Vb is input to a non-inverting input terminal (positive terminal) of the comparator 25, and the capacitor voltage Vc is input to an inverting input terminal (negative terminal). For this reason, the output signal Sb of the comparator 25 becomes high level when the analog signal Vb is higher than the capacitor voltage Vc. Then, the output signal Sb of the comparator 25 is input to the microcomputer 3 as another signal different from the wakeup signal.

(2) A buffer circuit 35 that receives the output signal Sb of the comparator 25 is added to the signal monitoring circuit 33. The buffer circuit 35 outputs the output signal Sb of the comparator 25 only while the underflow signal Sa of the high level is being output from the down-counter 21, and outputs the output signal of the low level in other cases. Also, the output signal Sc of the buffer circuit 35 is output to the microcomputer 3 as a high active wakeup signal.

Similarly, in the second embodiment, the charging time for allowing the charge voltage Vc at the charging completion time of the capacitor 15 due to the operation of the down-counter 21 to reach the reference voltage Vth for determining whether the brake pedal is pressed down or not is stored in the memory 19 of the signal monitoring circuit 33 by means of the microcomputer 3.

Then, the signal monitoring circuit 33 of the second embodiment detects that the analog signal Vb from the potentiometer 7 is higher than the reference voltage Vth when the signal monitoring circuit 33 operates after the microcomputer 3 becomes in the standby mode. In this case, the signal monitoring circuit 33 outputs the wakeup signal to the microcomputer 3.

Figure 5:
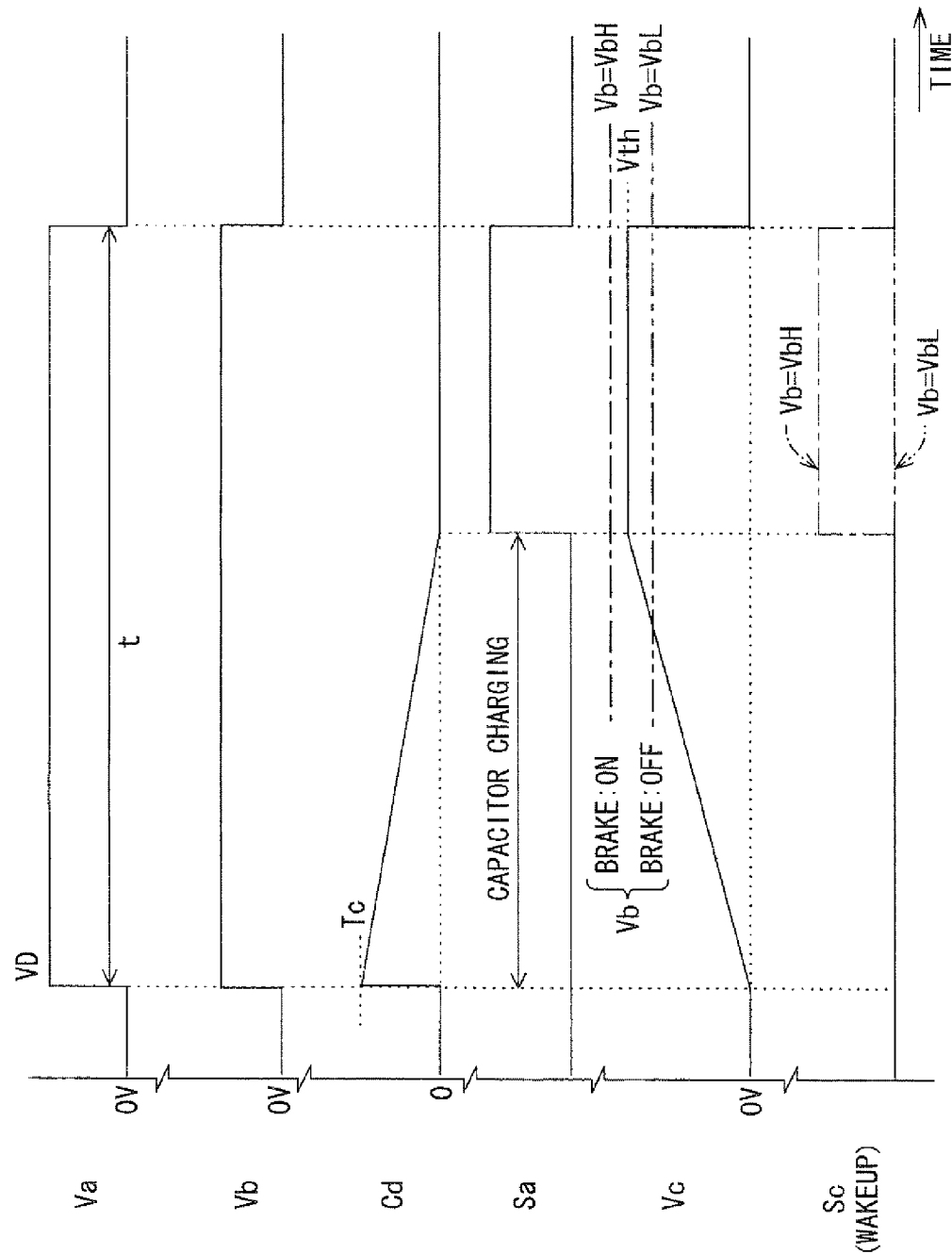
FIG. 5 is a timing chart showing the operation of a signal monitoring circuit in the second embodiment.

It is assumed that the brake pedal is not pressed down when the signal monitoring circuit 33 operates. In this case, as indicated by a two-dot chain line in FIG. 5, the analog signal Vb is VbL which is lower than the reference voltage Vth. When the capacitor 15 is charged for only the charging time Tc that is stored within the memory 19, the capacitor voltage Vc becomes equal to or higher than the analog signal Vb, and the output signal Sb of the comparator 25 becomes low. For this reason, even when the underflow signal Sa of the high level is output from the down-counter 21, the output signal Sc of the buffer circuit 35 remains low, and the high active wakeup signal is not output to the microcomputer 3.

On the contrary, it is assumed that the brake pedal is pressed down when the signal monitoring circuit 33 operates. In this case, as indicated by a one-dot chain line in FIG. 5, the analog signal Vb is VbH which is higher than the reference voltage Vth. Even when the capacitor 15 is charged for only the charging time Tc that is stored within the memory 19, the capacitor voltage Vc does not become equal to or higher than the analog signal Vb, and a relationship of Vb>Vc is satisfied. For this reason, the output signal Sb of the comparator 25 remains high during the operation of the signal monitoring circuit 33, and the underflow signal Sa of the high level is output from the down-counter 21. In this case, the output signal Sc of the buffer circuit 35 becomes high, Then, the output signal Sc of the high level is output to the microcomputer 3 as the wakeup signal. Then, the microcomputer 3 returns to the normal operation mode from the standby mode.

That is, the signal monitoring circuit 33 according to the second embodiment waits for the capacitor 15 to be charged for the charging time that is stored in the memory 19. Then, the signal monitoring circuit 33 detects that the analog signal Vb is higher than the capacitor voltage Vc after the completion of the charging operation by means of the comparator 25. In this case, the signal monitoring circuit 33 outputs the wakeup signal to the microcomputer 3 from the buffer circuit 35.

In the second embodiment, the microcomputer 3 waits for the signal Sb from the comparator 25 of the signal monitoring circuit 33 to change from high to low in S140 in the charging time setting process of FIG. 3. Then, when the signal Sb is changed to low, the microcomputer 3 proceeds to a subsequent S150. This is because the input signals to the respective input terminals of the comparator 25 are opposite to those in the first embodiment.

Similarly, in the second embodiment, the processing after S130 in FIG. 3 is executed in a state where the analog signal Vb becomes a voltage when the brake pedal is not pressed down. The voltage is VbL indicated by the two-dot chain line in FIG. 5. Also, for example, in the second embodiment, the reference voltage Vth can be set to be higher than the voltage value V1 (that is, the actual measurement value of VbL) of the analog signal Vb which has been detected in S130 of FIG. 3 by a given voltage V2. In this case, in S160 of FIG. 3, Vth in Expression 1 can be substituted with "V1+V2" to determine the charging time Tc.

Similarly, the same advantages as those of the ECU 1 of the first embodiment can be obtained by the ECU 31 of the second embodiment described above.

The present invention is not limited to the above embodiments. It will be obvious to those skilled in the art that various changes may be made without departing from the scope of the invention.

For example, the signal monitoring circuits 5 and 33 in the above respective embodiments cyclically operate regardless of the operation modes of the microcomputer 3. Alternatively, parts of the signal monitoring circuits 5 and 33 except for the circuits for applying the supply voltage VD to the potentiometer 7 can operate only while the microcomputer 3 is in the standby mode after the charging time setting process of FIG. 3 starts. Also, when the microcomputer 3 does not conduct the charging time setting process of FIG. 3, and does not change the charging time within the memory 19, the above parts of the signal monitoring circuits 5 and 33 can operate only while the microcomputer 3 is in the standby mode. Also, for example, when the ignition switch is on, or the microcomputer 3 is in the normal operation mode, the supply voltage VD can be always applied to the potentiometer 7.

Figure 4:
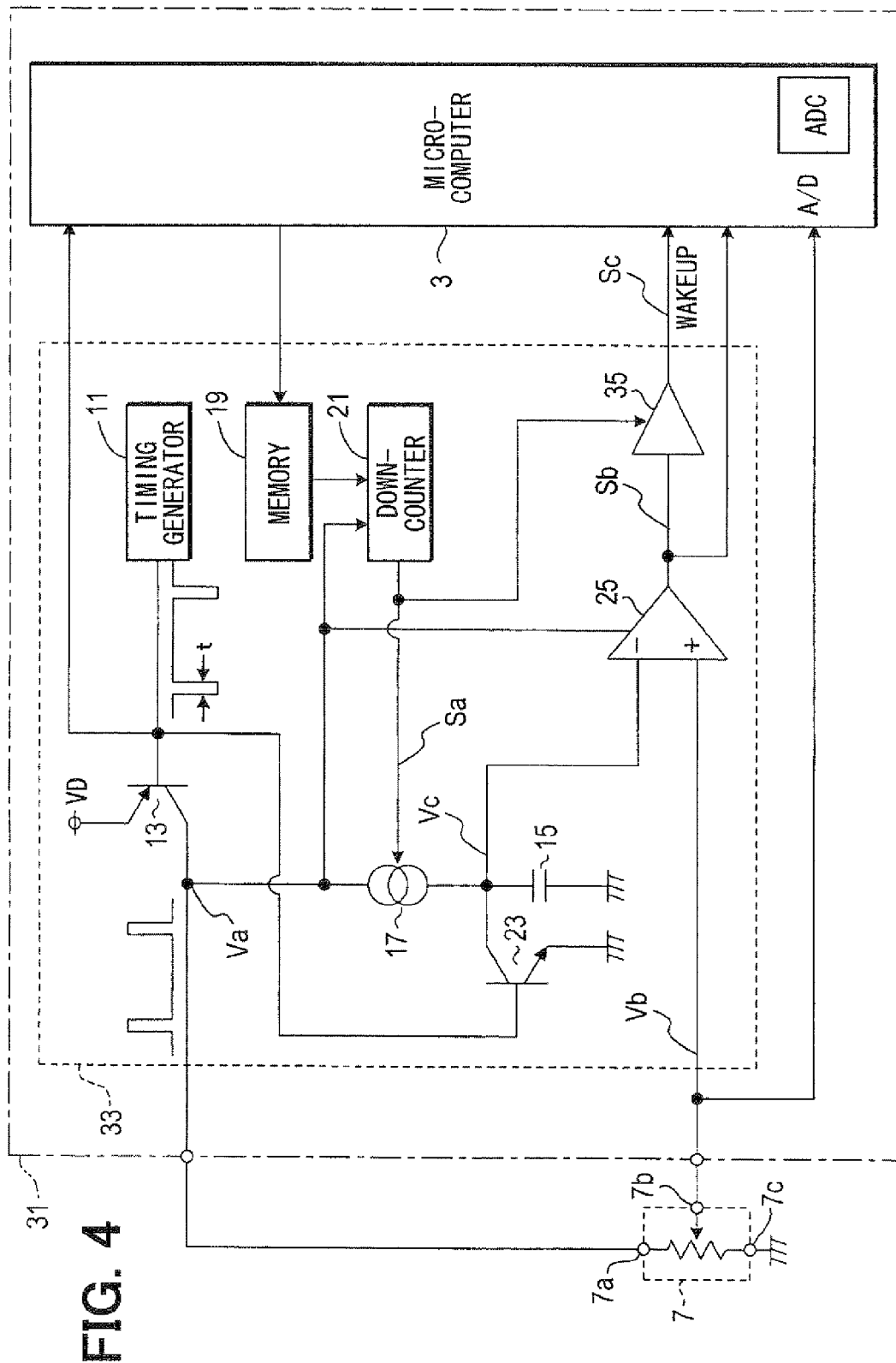
FIG. 4 is a circuit diagram showing an electronic control unit according to a second embodiment of the present invention.

On the other hand, in the signal monitoring circuit 5 of FIG. 1, when the output timing of the wakeup signal is going to be synchronous with the underflow timing of the down-counter 21, the same circuit as the buffer circuit 35 disposed in the signal monitoring circuit shown in FIG. 4 can be added.

Also, the charging time can be written in the memory 19 of the signal monitoring circuits 5 and 33 from an external device connected to the ECUs 1 and 33 at the time of manufacturing the ECUs 1 and 31.

Further, the embodiments can be applied to electronic control units other than the electronic control unit for a vehicle.

What is claimed is:

1. An electronic control unit comprising:
   a microcomputer that operatively switches to any one of a normal operation mode and a low power consumption operation mode; and
   a signal monitoring circuit that cyclically operates at least when the microcomputer is in the low power consumption operation mode, and outputs a wakeup signal that instructs the microcomputer to shift from the low power consumption operation mode to the normal operation mode upon detecting that a relationship between an analog signal received from an external side a reference voltage satisfies a predetermined relationship,
   wherein the signal monitoring circuit includes:
   a capacitor;
   a constant current circuit for charging the capacitor with a constant current;
   a memory that stores a charging time during which the constant current circuit charges the capacitor;
   a timer circuit that allows the constant current circuit to charge the capacitor for only the charging time that is stored in the memory during an operation of the signal monitoring circuit;
   a discharging circuit for discharging the capacitor while stopping the operation of the signal monitoring circuit; and
   a comparator that compares the analog signal with a charge voltage of the capacitor,
   wherein the charging time for allowing the charge voltage at charging completion of the capacitor to be used as the reference voltage is stored in the memory, and the wakeup signal is output to the microcomputer based on comparison results of the comparator.

2. The electronic control unit according to claim 1, wherein the signal monitoring circuit outputs the wakeup signal to the microcomputer when detecting that the analog signal is lower than the charge voltage of the capacitor by the comparator.

3. The electronic control unit according to claim 1, wherein the signal monitoring circuit outputs the wakeup signal to the microcomputer when detecting that the analog signal is higher than the charge voltage of the capacitor by the comparator after operation of charging the capacitor is completed.

4. The electronic control unit according to claim 1, wherein the charging time is written in the memory by the microcomputer.

5. The electronic control unit according to claim 4, wherein the microcomputer shifts from the normal operation mode to the low power consumption operation mode when determining that low power consumption operation mode shifting conditions are satisfied, the low power consumption operation mode shifting conditions including a condition that the analog signal and the reference voltage does not satisfy the predetermined relationship; and wherein, during a period until the microcomputer shifts to the low power consumption operation mode after determining that the low power consumption operation mode shifting conditions are satisfied, the microcomputer conducts a time measuring process of operating the signal monitoring circuit in a state where the constant current circuit continuously charges the capacitor until the charge voltage of the capacitor reaches the analog signal, and measuring a period of time until the comparator detects that the charge voltage of the capacitor reaches the analog signal after charging of the capacitor starts, and the microcomputer conducts a charging time updating process of determining the charging time to be written in the memory on the basis of the period of time measured by the time measuring process, and updating and writing the determined period of time in the memory.

6. A signal monitoring circuit mounted in an electronic control unit with a microcomputer that operatively switches to any one of a normal operation mode and a low power consumption operation mode, the signal monitoring circuit cyclically operating at least when the microcomputer is in the low power consumption operation mode, and outputting a wakeup signal that instructs the microcomputer to shift from the low power consumption operation mode to the normal operation mode upon detecting that a relationship between an analog signal received from an external side a reference voltage satisfies a predetermined relationship, the signal monitoring circuit including:
- a capacitor;
- a constant current circuit for charging the capacitor with a constant current;
- a memory that stores a charging time during which the constant current circuit charges the capacitor;
- a timer circuit that allows the constant current circuit to charge the capacitor for only the charging time that is stored in the memory during an operation of the signal monitoring circuit;
- a discharging circuit for discharging the capacitor while stopping the operation of the signal monitoring circuit; and
- a comparator that compares the analog signal with a charge voltage of the capacitor,
wherein the charging time for allowing the charge voltage at charging completion of the capacitor to be used as the reference voltage is stored in the memory, and the wakeup signal is output to the microcomputer based on comparison results of the comparator.

7. The signal monitoring circuit according to claim 6, wherein the comparator outputs the wakeup signal to the microcomputer when detecting that the analog signal is lower than the charge voltage of the capacitor by the comparator.

8. The signal monitoring circuit according to claim 6, wherein the comparator outputs the wakeup signal to the microcomputer when detecting that the analog signal is higher than the charge voltage of the capacitor by the comparator after operation of charging the capacitor is completed.

9. The signal monitoring circuit according to claim 6, wherein the charging time is written in the memory by the microcomputer.

* * * * *